United States Patent [19]

Knobloch

[11] 4,391,831
[45] Jul. 5, 1983

[54] ANIMAL FEED COMPOSITION AND METHOD FOR PRODUCING SAME

[76] Inventor: Joy E. Knobloch, 113 E. Haven, New Lenox, Ill. 60451

[21] Appl. No.: 224,681

[22] Filed: Jan. 13, 1981

[51] Int. Cl.$^3$ ............................................. A23K 1/00
[52] U.S. Cl. ...................................... 426/93; 426/96; 426/309; 426/305; 426/623
[58] Field of Search ................. 426/623, 635, 636, 93, 426/96, 102, 462, 309, 518, 630, 807, 302, 305, 311, 629

[56] References Cited

U.S. PATENT DOCUMENTS

| 38,798 | 6/1863 | Page | 426/636 |
|---|---|---|---|
| 2,198,214 | 4/1940 | Musher | 426/311 |
| 2,430,797 | 11/1947 | Zenzes | 426/623 |
| 2,947,632 | 8/1960 | Kruse | 426/302 |
| 3,484,243 | 12/1969 | Anderson et al. | 426/623 |
| 3,723,131 | 3/1973 | Bixby et al. | 426/93 |

FOREIGN PATENT DOCUMENTS 1325658  2/1962  France ............................... 426/623

*Primary Examiner*—Raymond N. Jones
*Assistant Examiner*—Elizabeth J. Curtin
*Attorney, Agent, or Firm*—Sabin C. Bronson

[57] ABSTRACT

An animal feed composition comprises particles of base feed material, e.g., grains such as oats, and, deposited on at least a portion of these particles, deposit material comprising substantially whole plant matter, preferably having a different make-up than the base feed material. An improved method for preparing an animal feed is also disclosed.

9 Claims, No Drawings

ANIMAL FEED COMPOSITION AND METHOD FOR PRODUCING SAME

BACKGROUND AND SUMMARY OF THE INVENTION

This invention relates to an improved animal feed composition and method for producing same. More particularly, the invention relates to an animal feed composition which has improved properties, e.g., enhanced nutritive value, which may be prepared by an improved manufacturing method.

Many different feed stuffs have been suggested for consumption by one or more types of animals. Certain of such animal feeds are disclosed in the following U.S. Pat. Nos. 2,968,559; 2,970,911; 3,063,839; 3,615,653; and 4,197,320.

Quite often in the past, animal feed stuffs have consisted of a base, e.g., grain material fortified by the addition of one or more specific chemical compounds to provide an improved property, e.g., a specific vitamin or other nutritive element, or improved palatability, to the feed. These additives are relatively expensive due, at least in part to the relatively complex processing needed to obtain the specific additive compound. Therefore, it would be advantageous to provide an animal feed having enhanced properties without the expense and material handling problems often associated with specific chemical additives.

Therefore, one object of the present invention is to provide an improved animal feed.

Another object of the present invention is to provide an animal feed having at least one enhanced property.

A further object of this invention is to provide an improved method for producing animal feed. Other objects and advantages of the present invention will become apparent hereinafter.

DESCRIPTION OF THE PREFERRED EMBODIMENT

An improved composition useful as animal feed has now been discovered. In one embodiment, the present composition comprises particles of base feed material and, deposited on at least a portion of the particles, deposit material comprising substantially whole plant matter. The plant matter, or mixtures thereof, chosen for deposition onto the base feed material is selected to provide the final animal feed with one or more improved properties, e.g., enhanced nutritive value, palatability and the like, as desired.

The use of substantially whole plant material (as that term is defined hereinafter) rather than, for example, specific and isolated chemical compounds, to provide an animal feed having one or more enhanced properties results in a number of substantial benefits. For example, such an animal feed does not involve the expense and/or complex processing involved in isolating specific chemical additives. Further, as will be discussed in detail hereinafter, the present feeds may be produced using relatively unsophisticated methods. This feature, along with the ready availability of different and varied plants, allows the individual animal owner to prepare a different, specific feed for any given individual animal, as desired. Also, the present invention allows one to feed a single composition rather than, for example, sequentially feed a base feed material and a plant supplement or supplements. The relative proportions of base feed material and plant matter in the present composition is not critical and may be adjusted as desired. This feature provides a reliable control mechanism on the relative amounts of base feed material and plant matter consumed by the animal.

The deposit material is preferably substantially uniformly distributed on at least a portion, preferably on substantially all, of the particles of base feed material. Also, it is preferred that the substantially whole plant matter comprising the deposit material have a different make-up (have a different chemical composition), more preferably be derived from a different living organism, relative to the base feed material.

The base feed material may be any suitable edible material. Preferably, the base feed comprises at least one grain type material. Typical grain type materials useful in the present invention include those derived from barley, oats, corn, maize, wheat, milo, mixtures thereof and the like. Excellent results are achieved using a base feed material derived from oats.

Any substantially whole plant matter, or mixture thereof, capable of enhancing the final animal feed as desired (without causing undue detrimental effect or effects on the animal being fed) may be employed. Such substantially whole plant matter is preferably derived from the group consisting of grasses, fruits, vegetables and mixtures thereof. As used herein the term "substantially whole plant matter" refers to the non-aqueous portion of a plant or integral portion thereof, derived directly from the plant or integral portion thereof. In other words, the present invention contemplates a deposit material comprising at least one plant or integral portion thereof, (e.g., fruit, vegetable or flower as opposed, for example, to the entire tree or bush) without specific chemical processing to isolate one or a limited number of chemical compounds. The plant or portion thereof used in the present invention may be physically processed, such as by peeling, cutting and the like, to remove undesired substances from the useful plant matter.

One particularly effective method of obtaining the present composition involves "liquifying" the plant or integral portion thereof. Many plants contain substantial amounts of water. Subjecting such plants to, for example, severe shear forces in a conventional blender, mixer, juicer and the like causes a breakdown in the physical structure of plant. The result is a mass of material containing both aqueous and non-aqueous portions. This material, which may be characterized as an emulsion-like mixture, is useful as the deposit material in the present invention.

In instances where the deposit material as applied to the base feed material includes a liquid, e.g., aqueous liquid, phase, it is preferred to include at least one, (e.g., uniformity or consistency) emulsifying agent effective to improve the stability added of the deposit material. Any suitable emulsifying agent or agents may be used in the present invention, provided that such agent or agents have no substantial detrimental effect on the animal being fed. One preferred emulsifying agent for use in the present invention is lecithin which, because of its chemical make-up, often provides added nutritive value to the animal feed of the present invention.

Although the relative proportions of the components, e.g., base feed material and deposit material, in the present compositions comprise a major amount, more preferably at least about 60%, by volume of the base feed material and a minor amount, more preferably in the range of about 1% to about 40%, by volume of said deposit material. Also, the deposit material (on a water-free basis) preferably comprises a major amount, more preferably at least about 70% by volume of substantially whole plant matter. When an emulsifying agent is present, it is preferred that the emulsifying agent comprise a minor amount, more preferably, about 0.5% to about 10%, by volume of the deposit material on a water-free basis.

In another aspect, the present invention involves a method for producing an animal feed. In one embodiment, this method comprises contacting particles of base feed material (such as defined elsewhere herein) with a mixture, preferably including a liquid, more preferably aqueous phase, comprising substantially whole plant matter (as defined herein) to deposit at least a portion of the plant matter on at least a portion of the particles and form deposit containing particles.

Where a liquid phase is present in the mixture, it is preferred that the deposit containing particles be subjected, to processing, e.g., during, heating, tumbling and the like, to remove at least a portion of the liquid phase and form dried deposit containing particles. Also, when a liquid is present, it is preferred that the mixture further comprise at least one added emulsifying agent, more preferably a minor amount by volume of at least one emulsifying agent, effective to improve the stability (e.g., uniformity or consistency) of the mixture. Suitable emulsifying agents include those which have no substantial detrimental effect on the animal to be fed by the resulting feed product. Lecithin, e.g., soy derived lecithin, is a preferred emulsifying agent.

Although the relative proportions of base feed material and mixture are not critical to the present method, it is preferred that a major amount by volume of base feed material be contacted with a minor amount by volume of the mixture to form the deposit containing particles.

In order to avoid undue chemical deterioration and/or loss of palatability of the dried deposit containing particles, the processing to remove at least a portion of the liquid phase from the deposit containing particles is carried out at a temperature in the range of less than about 350° F.

The present methods provide unique products which are useful as animal feeds and have substantial benefits, e.g., enhanced nutritive value and/or palatability. In addition, as can be seen from the description herein, these products are obtained by processing which does not require sophisticated and/or expensive process steps, e.g., separation techniques.

The following examples illustrate certain embodiments of the present invention and are not to be construed to limit the scope of the invention.

EXAMPLE I

Three pounds of carrots, including green tops, were scrubbed to remove residual soil and processed in a conventional juicer appliance to yield about thirteen fluid ounces of carrot derived liquid. About one ounce of this liquid was greenish (from chlorophyll) in color and upon sitting rose to the top. The remainder of the material was an orange colored liquid containing finely pulverized vegetable fiber.

A lecithin mixture was prepared as four parts when otherwise stated, (all parts herein refer to volume parts) of water at 110°-120° F. were added to two parts of commercially available soy lecithin granules. The granules were soaked until they expanded to about one and one-half times their original size. The combination of water and lecithin granules were then processed in a blender appliance until a thick, pale yellow liquid is formed. Five parts of water, at about 68° F., was then added and the mixture was reblended to yield a thinner liquid. This lecithin mixture was then refrigerated until needed.

Appropriate amounts of the lecithin mixture and carrot derived liquid were combined into a combined mixture containing 8% by volume of the lecithin mixture and about 92% by volume of the carrot derived liquid. The combined mixture was stirred together until no color separation was visible.

One part of this combined mixture was combined with two parts of conventional oat derived horse feed. This combination was slowly stirred and mixed until the oats were evenly colored and there was no apparent liquid phase remaining.

The resulting carrot-oat material was then placed into a rotary oven at a temperature of between 250° and 300° F., for about one hour to remove at least a portion of the water from the material. After this time, the material forms clusters no bigger than about one-fourth inch in diameter. Larger clusters mean that the material is too moist and requires additional time in the oven. After oven processing, the carrot-oat material should have a pumpkin color. If the material turns brownish or overly crisp, it has been over processed. The material may be heated on trays, but should be stirred about every twenty minutes until done.

After oven processing, the dried carrot-oat material are cooled to room temperature before being stored in air tight containers.

This dried carrot-oat material was fed to horses and found to be effective as a horse feed. In particular, this material was found to provide enhanced nitritive value, e.g., increased potassium and calcium contents, and improved palatability relative to the basic oat feed.

EXAMPLE II

A clover based feed was prepared as follows.

Approximately two and seven-eighths pounds of clover in blossom was processed in a juicer appliance to yield seven and one-fourth fluid ounces of clover derived liquid. The preferred clover plants to pick are those which are short, bushy and lie close to the ground. Before juicing, the clover was washed in ice water to kill any bugs and worms and to wash away other debris.

Example I was repeated except that the clover derived liquid replaced the carrot derived liquid. After oven processing, the dried clover-oat material had a forest green color.

The dried clover-oat material was fed to horses and found to be effective as a horse feed. This material was found to provide enhanced nutritive value, e.g., increased riboflavin, calcium and potassium contents, and improved palatability relative to the basic oat feed.

While this invention has been described with respect to various specific examples and embodiments, it is to be understood that the invention is not limited thereto and that it can be variously practiced within the scope of the following claims.

What is claimed is:

1. A method for producing an animal feed comprising contacting particles of base feed material with a mixture comprising an aqueous liquid phase derived from at least one plant and substantially whole plant matter from said plant to deposit at least a portion of said plant matter on at least a portion of said particles and form deposit containing particles, and drying said deposit containing particles to remove at least a portion of said liquid phase and form dried deposit containing particles having deposited thereon substantially whole plant matter.

2. The method of claim 1 wherein said mixture further comprises a minor amount by volume of at least one added emulsifying agent effective to improve the stability of said mixture.

3. The method of claim 2 wherein said base feed material is at least one grain type material; said substantially whole plant matter has a different make-up from said base feed material and is selected from the group consisting of grasses, fruits, vegetables and mixtures thereof; and said added emulsifying agent is lecithin.

4. The method of claim 3 wherein a major amount by volume of said particles of base feed material are contacted with a minor amount of volume of said mixture to form said deposit containing particles.

5. The method of claim 4 wherein said contacting to remove at least a portion of said liquid phase is carried out at a temperature less than about 350° F.

6. A composition prepared by the method of claim 1.

7. A composition prepared by the method of claim 2.

8. A composition prepared by the method of claim 4.

9. A composition prepared by the method of claim 5.

* * * * *